United States Patent [19]
Saito et al.

[11] Patent Number: 5,198,868
[45] Date of Patent: Mar. 30, 1993

[54] LASER SURVEYING SYSTEM HAVING A FUNCTION OF MARKING REFERENCE POINTS

[75] Inventors: Takeo Saito, Tokyo; Yoshiaki Ishida, Chichibu; Nobuyuki Fukunaga, Toyama; Mutsuhiko Kimura, Aichi; Yasuo Metoki, Ushiku; Kenji Miyahara, Ichikawa, all of Japan

[73] Assignees: Sato Kogyo Co., Ltd., Toyama; Mac Co., Ltd., Chiba, both of Japan

[21] Appl. No.: 915,401

[22] Filed: Jul. 20, 1992

Related U.S. Application Data

[63] Continuation of Ser. No. 793,957, Nov. 15, 1991, abandoned.

[30] Foreign Application Priority Data

Nov. 16, 1990 [JP] Japan .................................. 2-308511

[51] Int. Cl.⁵ .............................................. G01J 40/14
[52] U.S. Cl. .................................... 356/142; 356/140; 356/152; 250/206.1
[58] Field of Search ....................... 356/142, 140, 152; 250/206.1

[56] References Cited

U.S. PATENT DOCUMENTS 4,513,504  4/1985  Nussbaumer et al. .......... 356/153 X
5,055,666  10/1991  Miyahara ........................ 356/152 X

FOREIGN PATENT DOCUMENTS 61-262611  11/1986  Japan .
1-250718  10/1989  Japan .
2-112718   4/1990  Japan .
WO80/01003  5/1980  PCT Int'l Appl. .

Primary Examiner—Mark Hellner
Attorney, Agent, or Firm—Wenderoth, Lind & Ponack

[57] ABSTRACT

In laser surveying system has a laser measuring unit which is operable independently of a laser projector, a laser spot pattern is first determined by using the laser measuring unit and projected onto the working face of an object structure by driving the laser projector. While marking the working face with the laser spot pattern formed by the laser projector to execute the desired construction work, the laser measuring unit is turned toward a different measuring object so as to independently make other measurements. Thus, point marking and measurement on different objects can be rationally effected at one time.

4 Claims, 4 Drawing Sheets

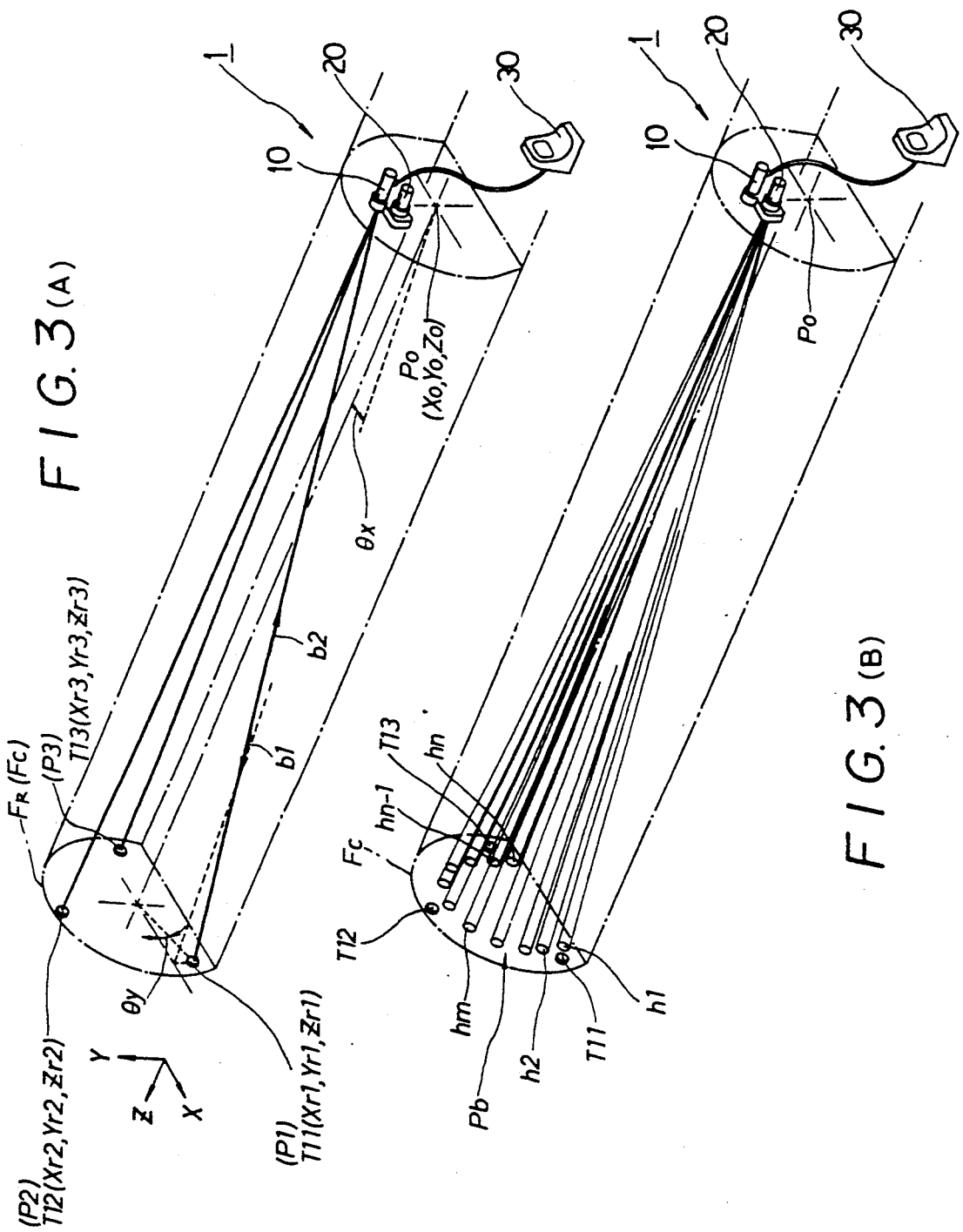

LASER SURVEYING SYSTEM HAVING A FUNCTION OF MARKING REFERENCE POINTS

This application is a continuation of now abandoned application, Ser. No. 07/793,957, filed Nov. 15, 1991.

BACKGROUND OF THE INVENTION

1. Field of the Invention

This invention relates to a laser surveying system capable of measuring reference points necessary for executing building or civil engineering work by use of a a laser and marking the reference points with laser spot pattern on the basis of the measuring results.

2. Description of the Prior Art

For surveying, measurement and maintenance of all sorts of constructions such as buildings, roads and tunnels, there have been widely used various types of handy laser surveying systems capable of providing highly accurate measurement. Not infrequently there are times when measuring reference points on the construction as noted above are desired to be marked on the basis of structural data obtained as the result of the measurement. In a case of marking a structure such as a working pit face of a tunnel, a method is commonly used in which reference points are manually marked one by one with paint while projecting one laser spot on the object structure to indicate one of a reference points. In particular, the use of the visible laser is available in tunneling work which is carried out in a dark place.

For example, in the so-called "NATM" tunneling method, a hard base rock in the working pit face of a tunnel is blasted with explosives. In the blasting tunneling work, explosive charging holes are previously bored in the working pit face at the geodetically specified points predetermined in accordance with the design of the tunnel construction which are strictly determined in advance. Although the specified points at which explosive charging holes are bored in the working pit face of the tunnel can be automatically established by use of a computer, the work of marking the design points for boring the explosive charging holes has been manually carried out, and automation of marking the working pit face in the tunneling construction cannot yet be accomplished.

A laser projector used in a laser marking method for optically determining a plurality of surveying or working reference points on the working face of the object structure to be marked radiates one laser beam to form one laser spot on the working face. Therefore, the aforesaid reference points were indicated by the laser spot one by one to be marked manually with paint. The manual marking work with paint is continued for other reference points in order, but turns out to be a very troublesome chore.

To be more specific, when the explosive charging holes are bored in the working pit face in the tunneling work, one of the portions to be bored on the working pit face is optically indicated by the laser spot issued from the laser projector and marked manually with paint. Upon completion of marking one portion with paint, the laser projector is moved so as to form the laser spot on another objective portion in which the hole is bored in the working face. The objective portion is marked manually with paint while being indicated by the laser spot in the same manner. This marking work is repeated, but cannot be automatically executed and is much harder and more time-consuming than might be expected.

Furthermore, the conventional laser marking device including the laser projector is disadvantageous in that the operation rate thereof is low. That is to say, the laser marking device of this type is used only when the marking is performed, but is out of operation when other measurement or work such as timbering is executed. Thus, the conventional laser marking device can not be used efficiently. For instance, in tunneling work, another measuring device is necessary for making a land survey or measuring displacement of a different object structure when performing the optical marking on the working face by use of the laser projector. Thus, the conventional laser marking device has been used only inefficiently.

OBJECT OF THE INVENTION

An object of the present invention is to provide a laser surveying system having rational functions of continuously marking a plurality of reference points on an object structure such as a tunnel by use of a laser projector which forms a laser spot pattern on a working face and simultaneously making measurements of other working points, which has high operation rate and which can be used efficiently.

Another object of the present invention is to provide a high performance laser surveying system capable of being remotely controlled to effect reference point marking and surveying operations with ease.

SUMMARY OF THE INVENTION

To accomplish the objects described above according to the present invention there is provided a laser surveying system comprising a laser measuring unit for effecting distance and angular measurements, a laser projector issuing a laser beam to a working face to form a laser pattern with laser spots on the working face so as to optically indicate reference points on the working face, and a controller unit for determining spot data on the basis of the surveying data outputted from the laser measuring unit and predetermined design data and controlling the laser projector in accordance with the spot data, the laser measuring unit being operated independently of the laser projector while forming the laser pattern on the working face by the laser projector.

The laser measuring unit capable of distance and angular measurement may be mounted rotatably for movement in all directions. The laser measuring unit is first located at a surveying base station, and operated by inputting the predetermined design data to the controller unit. On the basis of surveying data obtained as a result of the measurements conducted by the laser measuring unit, the laser spot pattern is projected from the laser projector to depict the laser spots on working reference points of the working face. After the reference points are indicated on the working face by the laser spot pattern, the desired construction work is carried out in accordance with the reference points thus indicated.

Since the laser measuring unit is operated independently of the laser projector, it can be directed in the other direction so that other measurements can be independently effected. The controller unit can to be remotely controlled by remote controlling means.

Other and further objects of this invention will become obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

FIGS. 3(A) through 3(C) are explanatory diagrams showing the operation principle of the system of this invention.

DESCRIPTION OF THE PREFERRED EMBODIMENT

The present invention will be more fully understood from the detailed description given hereinbelow and the accompanying drawings which are given by way of illustration only, and thus are not limitative of the present invention.

Figure 1:
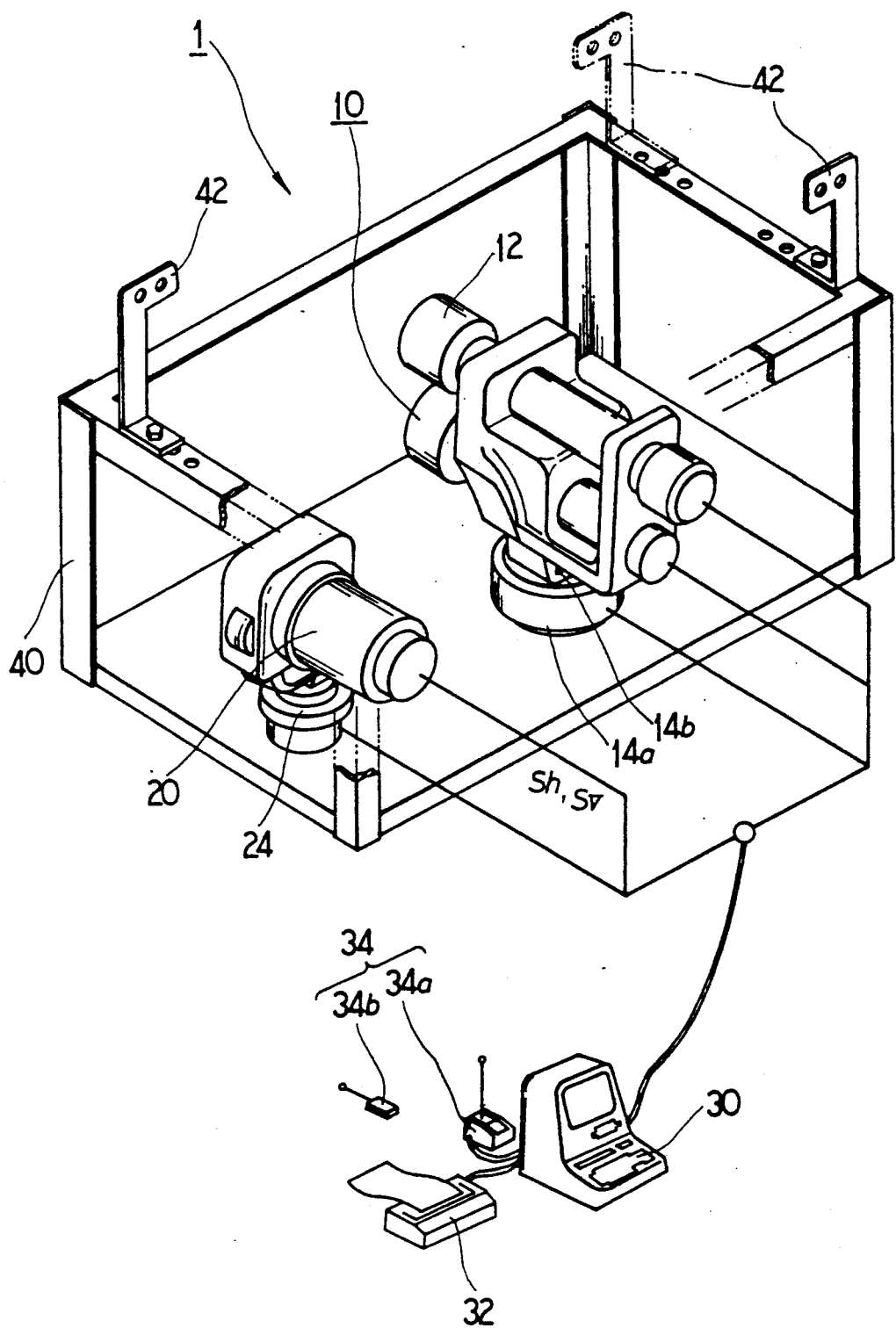
FIG. 1 is a schematic view showing one preferred embodiment of the laser surveying system according to this invention.
Figure 2:
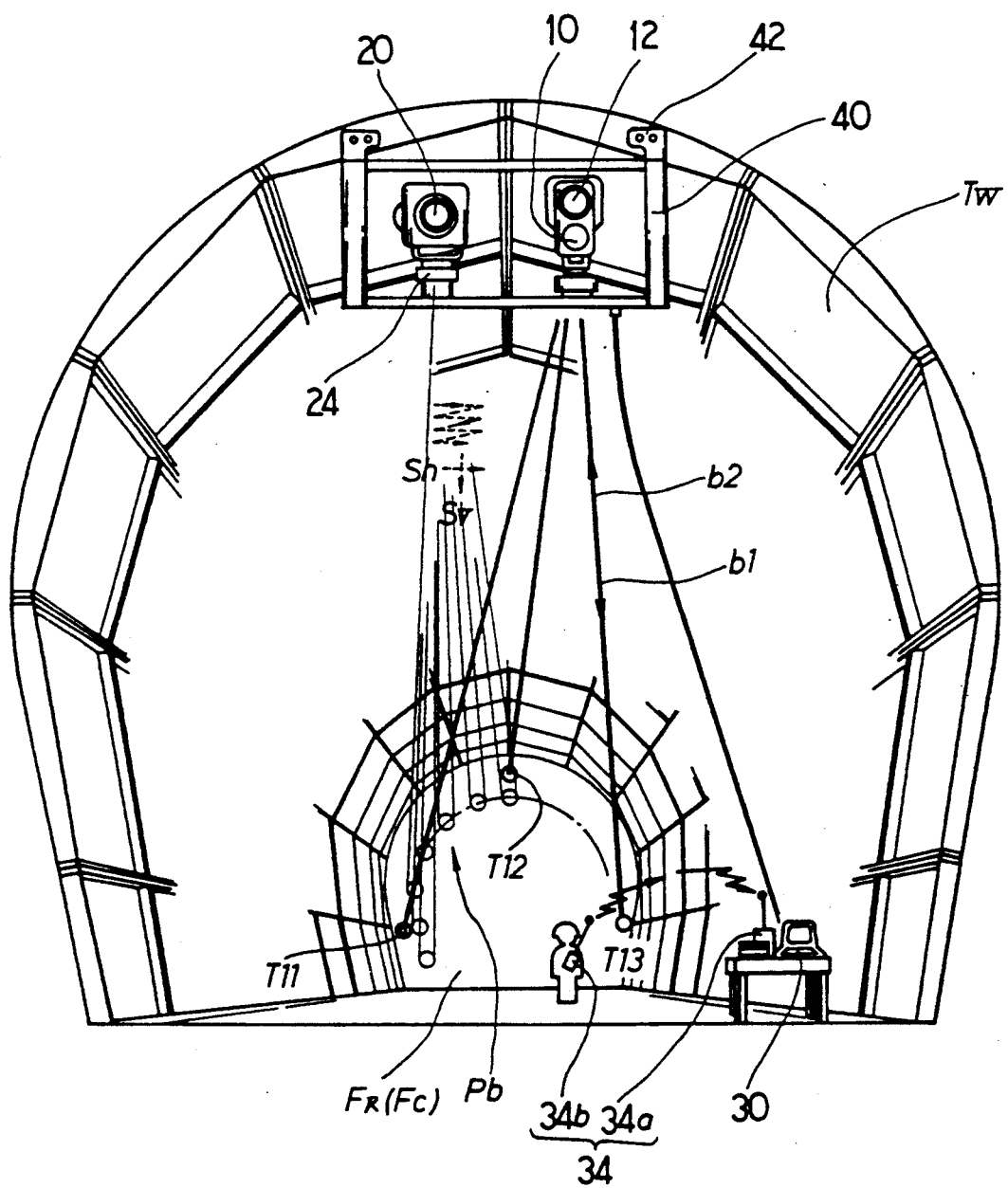
FIG. 2 is an explanatory diagram showing the system of FIG. 1, which is applied to tunneling work.
Figure 3C:
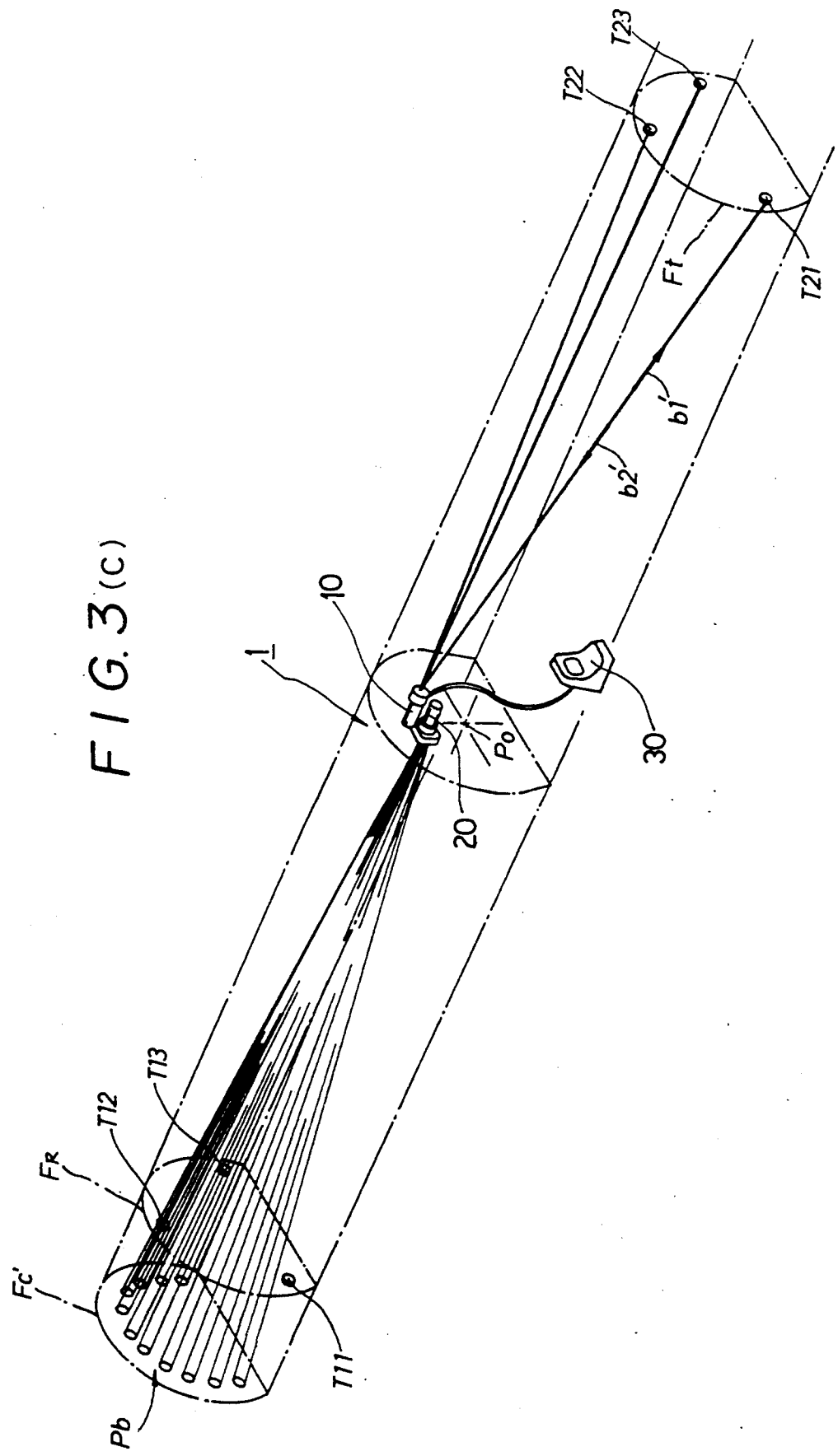

As illustrated in FIGS. 1-3, the laser surveying system 1 of this invention is located at a surveying base station Po and comprises a laser measuring unit 10 for measuring a distance from the surveying base station to a reference point Pn (n=1,2,3 . . . ) which is determined arbitrarily and an angle relative to the reference point, and a laser projector 20 for projecting a laser spot pattern on a working face (e.g. pit face in a tunnel) Fc to be marked, and a controller unit 30 for performing an arithmetic operation on the measured data obtained from the laser measuring unit 10 and controlling the laser measuring unit 10 and the laser projector 20.

The aforementioned laser measuring unit 10 and laser projector 20 are mounted in a support frame 40 installed at the surveying base station by fixing means 42. When the laser surveying system 1 of this embodiment is applied to tunneling work as illustrated as one example, the fixing means 42 are suspending plates so as to suspend the laser surveying system 1 from the crown portion of the tunnel interior wall Tw as shown in FIG. 2. In a case of installing the laser surveying system 1 on the ground in the tunnel, a tripod or table may be used as the fixing means 42 as a matter of course.

The laser measuring unit 10 has a laser oscillator 12 which issues a laser beam b1 toward respective reflector targets T11 to T13 placed in position on the working face Fc and receives the returning beam b2 reflected from the target so as to measure the distance and angle of the target relative tot he base station Po.

The laser measuring unit 10 is mounted on a universal slewing means composed of a horizontally rotating motor 14a and a vertically rotating motor 14b. By jointly operating the horizontally and vertically rotating motors 14a, 14b, the laser beam b1 issued from the laser measuring unit 10 can be directed substantially in all directions.

As the laser projector 20, there may be used an ordinary image displaying system capable of vertically and horizontally deflecting a laser beam issued therefrom to form the desired spot pattern Pb on the working face Fc. The laser projector 20 is provided with a directional control means 24 so as to allow the projector to angularly move vertically and horizontally.

The controller unit 30 has a data input means such as a keyboard, a display means such as a CRT, and a memory unit for storing various data. As the controller unit 30, a general purpose computer, preferably, a handheld computer may be used. A printer for printing out measured data obtained from the system may be used if needed.

The controller unit 30 is remotely controlled by use of a remote controlling means 34 composed of a transmit-receiver base unit 34a and a wireless control hand unit 34b which is carried by an operator. By operating the hand unit 34b at a place remote from the surveying base station Po, the laser measuring unit 10, laser projector 20 and controller unit 30 can be controlled by wireless.

The procedure for marking reference points for boring explosive charging holes in the working face of a tunnel under construction by use of the laser surveying system according to this invention will be described with reference to generalized diagrams shown in FIG. 3(A) and FIG. 3(B). This invention is here described as being applied for the marking of reference points for boring explosive charging holes in the tunneling work as one embodiment of this invention, but it is applicable to any other construction and industrial fields.

Prior to execution of the tunneling work, a geological survey and a soil analysis are performed for preparing planning and executing designs so as to determine the number (n) and positions of explosive charging holes to be bored in the working face Fc at every location along the design route of the desired tunnel.

The coordinates of the designed points for the explosive charging holes can be determined by the angles of the directions of X-axis, Y-axis and Z-axis. The designed points are expressed by mathematics which are programmed in the controller unit 30. When boring the explosive charging holes in the working face, the designed points for the boring holes are required to be marked on the working face Fc. The marking is optically made continuously by use of the laser surveying system of the present invention.

In the first of the operations for marking the reference points designed as the boring points, the laser surveying system 1 of this invention is located confronting the working face (marking surface) Fc at the surveying base station Po remote from the working face Fc.

The surveying base station Po may be located at any place in the tunnel, but it is defined by predetermined positional coordinates (Xo, Yo, Zo) established previously. Also, the laser surveying unit 1 may be installed anywhere in the cross section at the surveying base station Po, but it is preferably fixed on the crown portion of the tunnel by use of the fixing means 42 to be out of the way in the tunnel as shown in FIG. 2. The controller unit 30 is placed near the laser surveying unit 1, and connected to the laser measuring unit 10 and the laser projector 20 by wiring. In general, it is desirable to locate the laser surveying system 1 about 50 meters away from the working face Fc, when the route in the tunnel is straight.

Next, at three datum points in a reference surface Fr which is arbitrarily determined in the tunnel, the reflector targets T11-T13 are located. In the first operation stage, the reference face Fr is the working pit face Fc of the tunnel. The absolute coordinates (Xrk, Yrk, Zrk) [k=1, 2, 3] of the datum points at which the targets are placed may be predetermined in designing the tunnel and recognized by the laser measuring unit 10 located at the surveying base station Po.

As the targets T11-T13, there may be used cubic corner prisms capable of reflecting incident light in the direction in parallel to the incident light.

Then, the laser measuring unit 10 is operated to irradiate the laser beam b1 toward the respective reflector targets T11-T13 so as to precisely measure the distances from the laser measuring unit 10 to the respective targets T11-T13 by analyzing the time difference between the laser beam b1 outputted therefrom and the reflected laser beam b2 returning from the targets T11-T13 and, at the same time, to determine the angles at which the laser beam b1 is directed to the respective targets. From the measured distances and angles (X-axis deflection angle $\theta x$ and Y-axis deflection angle $\theta Y$) relative to the respective targets, the relative position (absolute coordinates: Xo, Yo, Zo) of the laser surveying system 1 to the targets can be perceived with a high degree of accuracy Upon completion of the measurement of the absolute positional coordinates of the laser surveying system 1 and the working face Fc, the predetermined positional data (coordinates: Xhm, Yhm, Zhm [m=1 ... n]) as noted above for determining the reference points at which the desired explosive charging holes are bored in the working face Fc are inputted to the controller unit 30 and the unit is caused to perform an arithmetic operation and obtain control signals Sh and Sv for controlling the vertical and horizontal deflections of the laser beam issued from the laser projector 20.

With the control signals Sh, Sv outputted from the controller unit 30, the laser projector 12 is operated to irradiate the laser beam toward the working face Fc so as to form a laser pattern Pb depicting spots (h1 ... hm ... hn) by which the positions for boring the desired explosive charging holes are optically indicated as illustrated in FIG. 3(B).

While projecting the laser pattern Pb to optically mark the desired points on the working face, boring work can be carried out to bore the holes for charging the explosives in the working face without paint-marking, for example. Upon completion of boring of explosive charging holes in the working face, charging of the explosives into the bored holes, blasting, mucking, and timbering are subsequently carried out to drive forward the working face.

If the working face Fc advances to the portion Fc' beyond the reference surface Fr as the result of digging the tunnel, the laser spot pattern Pb designed in advance can be formed with the laser projector 20 on the advanced working face Fc' by taking a measurement of the working face Fc' by use of the laser measuring unit 10 in the same manner as above.

While continuously projecting the laser spot pattern onto the working face to execute the desired construction work on the working face as described above, the laser measuring unit 10 can be turned toward another surveying object in order to make another survey or measurement on a second reference face Ft (arbitrarily defined cross section in the tunnel) on which reflector targets T21-T23 are disposed. That is to say, upon storing the positional data of the targets T11-T13 on the first reference surface Fr (working face Fc) in the controller unit 30, the laser measuring unit 10 is turned toward the second reference face Ft and issues a laser beam b1' toward the respective reflector targets T21-T23. The desired measurement or survey on the second reference face Ft can be completed on the basis of the time difference between the issued beam b1' and reflected laser beam b2' from the reflector target on the second reference face.

The measured data obtained as the result of the aforesaid measurement are stored in the controller unit 30 in succession. Of course, in the same manner, any other measuring object can be measured by turning the laser measuring unit 10. Thus, by collectively analyzing the measured data obtained in numbers and stored in the controller unit 30, overall deformation, displacement and other physical changes of the construction such as a tunnel can be measured with a high degree of accuracy. The measured data and input data stored in the controller unit 30 can be graphically displayed together with the appearance of the object structure including the surveying base station, working face and surveying reference points and optionally printed out by the printer 32 for postmortem.

The control for projecting the laser spot pattern on the working face, confirmation of the location of the reference points, correction of input data and other necessary adjustment can be easily performed remotely by handling the remote controlling means 34.

It is clear from the description given above that the laser surveying system provided by the present invention can fulfill a rational function of carrying out measurement of some surveying objects while optically marking reference points on a different object structure by use of a laser projector which forms a laser spot pattern on a working face of the object structure. Thus, the laser surveying system has a high operation rate and can be used efficiently. Besides, the laser surveying system of this invention can be controlled remotely to carry out the point marking and surveying works with ease.

It is to be understood that the invention is not limited in its application to the de&ails of construction and arrangement of parts illustrated in the accompanying drawings, since the invention is capable of other embodiments and of being practiced or carried out in various ways. Also it is to be understood that the phraselogy or terminology employed herein is for the purpose of description and not of limitation.

What is claimed is:

1. A laser surveying system comprising:
    a laser oscillator for projecting a laser beam toward at least one reflector target;
    a laser measuring unit attached to said laser oscillator for receiving a laser beam projected by said laser oscillator and reflected by a laser target and effecting distance and angular measurements with reference to the received laser beam and outputting surveying data based on said measurements;
    a laser projector projecting a laser beam to a working face and deflecting the laser beam vertically and horizontally to form a laser spot pattern on the working face so as to optically indicate reference points on the working face, said laser projector being operable independently of said laser oscillator and said laser measuring unit for forming the laser spot pattern on the working face; and
    a controller unit operably connected to said laser means and said laser projector for determining spot data from the surveying data outputted from said laser measuring unit and predetermined design data and for controlling said laser projector in accordance with the thus determined spot data.

2. A laser surveying system as claimed in claim 1 in which said laser oscillator and laser measuring unit are movable horizontally and vertically relative to a reference plane.

3. A laser surveying system as claimed in claim 1 in which said laser projector is movable vertically and horizontally independently of said laser oscillator and said laser measuring unit.

4. A laser surveying system as claimed in claim 1 further comprising a transmit-receive base unit connected to said controller unit and a wireless control hand unit for remotely controlling said controller unit through said base unit.

* * * * *